Figure 1:
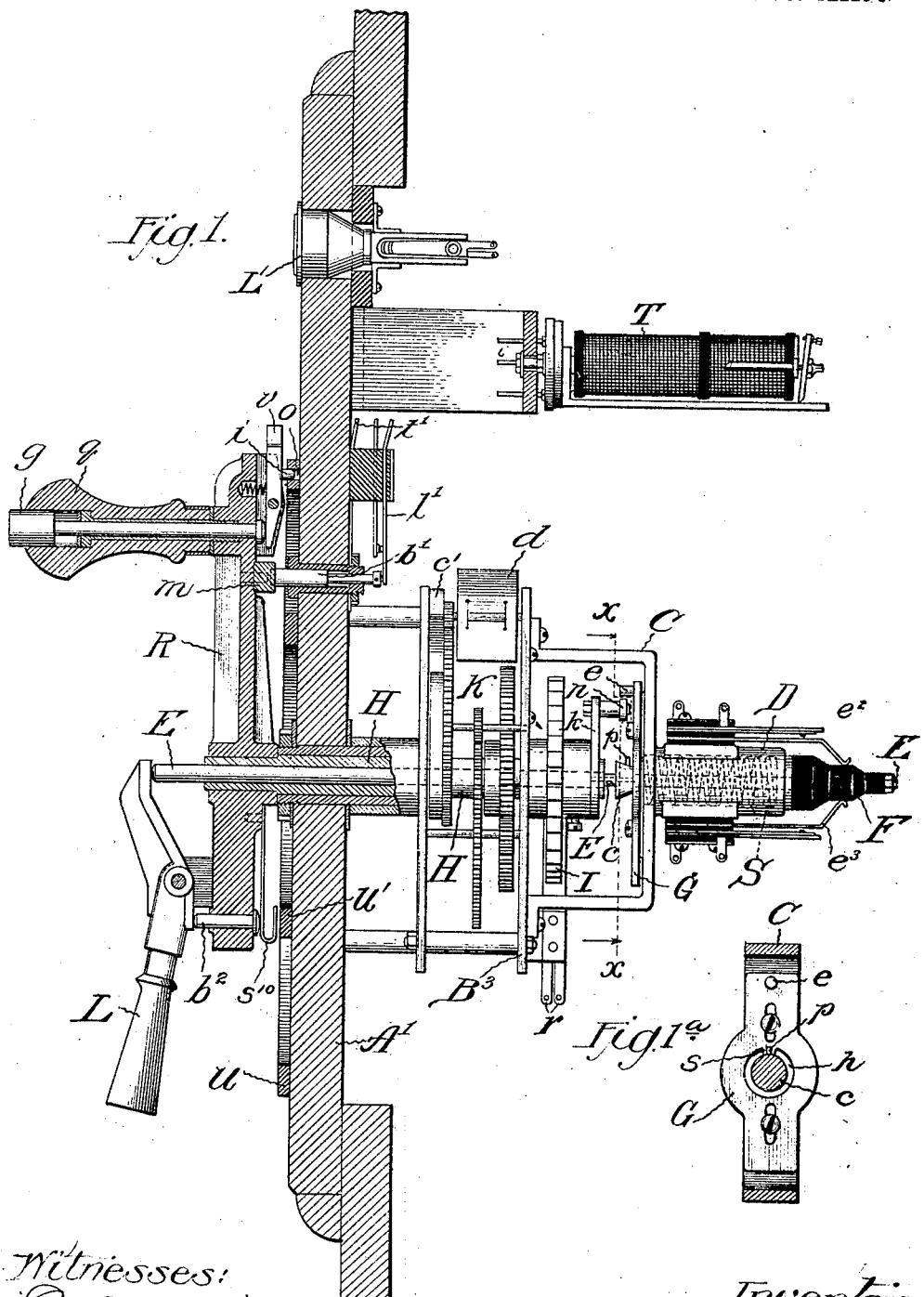

No. 830,247. PATENTED SEPT. 4, 1906.
F. R. McBERTY.
SELECTIVE SIGNAL SYSTEM FOR RAILWAYS.
APPLICATION FILED JULY 24, 1905.

12 SHEETS—SHEET 1.

Witnesses:
Geo. C. Davison
A. H. Moore

Inventor:
Frank R. McBerty,
By Bastain Spencer
Attorneys

No. 830,247. PATENTED SEPT. 4, 1906.
F. R. McBERTY.
SELECTIVE SIGNAL SYSTEM FOR RAILWAYS.
APPLICATION FILED JULY 24, 1905.

12 SHEETS—SHEET 2.

Witnesses:

Inventor:
Frank R. McBerty,
By Barton  
Attorneys

No. 830,247. PATENTED SEPT. 4, 1906.
F. R. McBERTY.
SELECTIVE SIGNAL SYSTEM FOR RAILWAYS.
APPLICATION FILED JULY 24, 1905.

12 SHEETS—SHEET 3.

Witnesses:
Geo. C. Davison
A. H. Moore.

Inventor:
Frank R. McBerty.
By Barton & Sauner
Attorneys.

No. 830,247. PATENTED SEPT. 4, 1906.
F. R. McBERTY.
SELECTIVE SIGNAL SYSTEM FOR RAILWAYS.
APPLICATION FILED JULY 24, 1905.

12 SHEETS—SHEET 4.

Witnesses:
Geo. C. Davison
A. H. Moore

Inventor:
Frank R. McBerty,
By Barton Tanner
Attorneys.

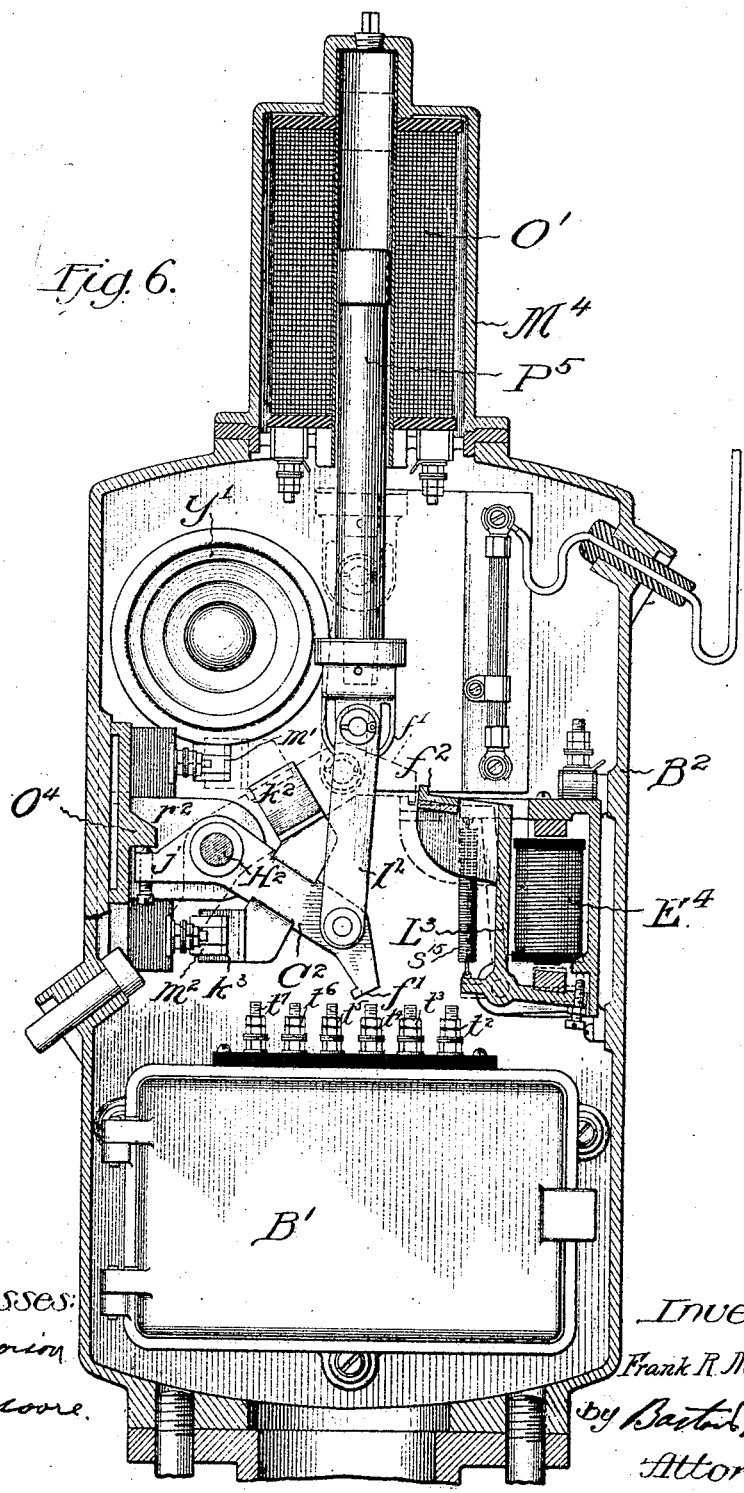

No. 830,247. PATENTED SEPT. 4, 1906.
F. R. McBERTY.
SELECTIVE SIGNAL SYSTEM FOR RAILWAYS.
APPLICATION FILED JULY 24, 1905.
12 SHEETS—SHEET 6.
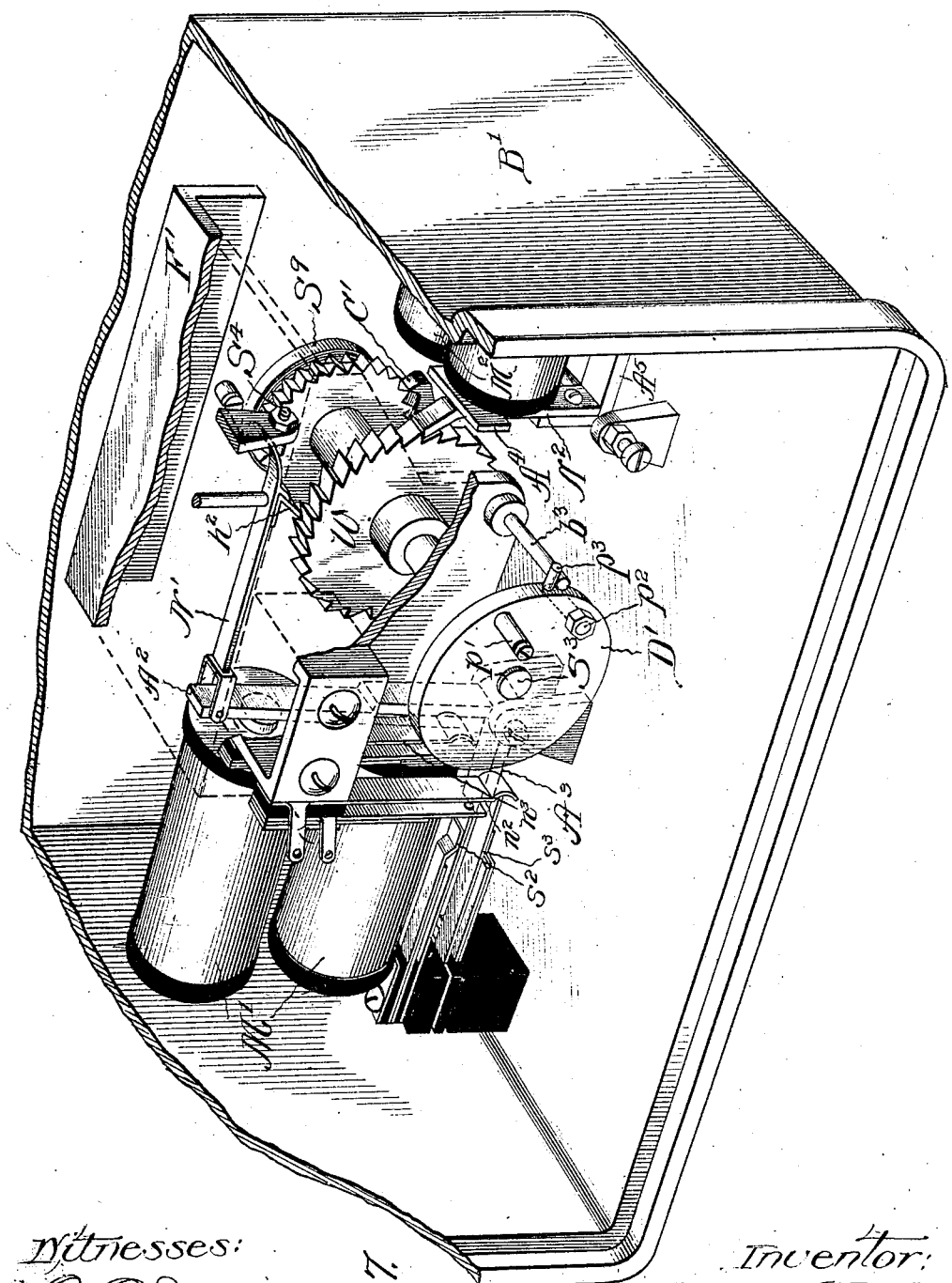

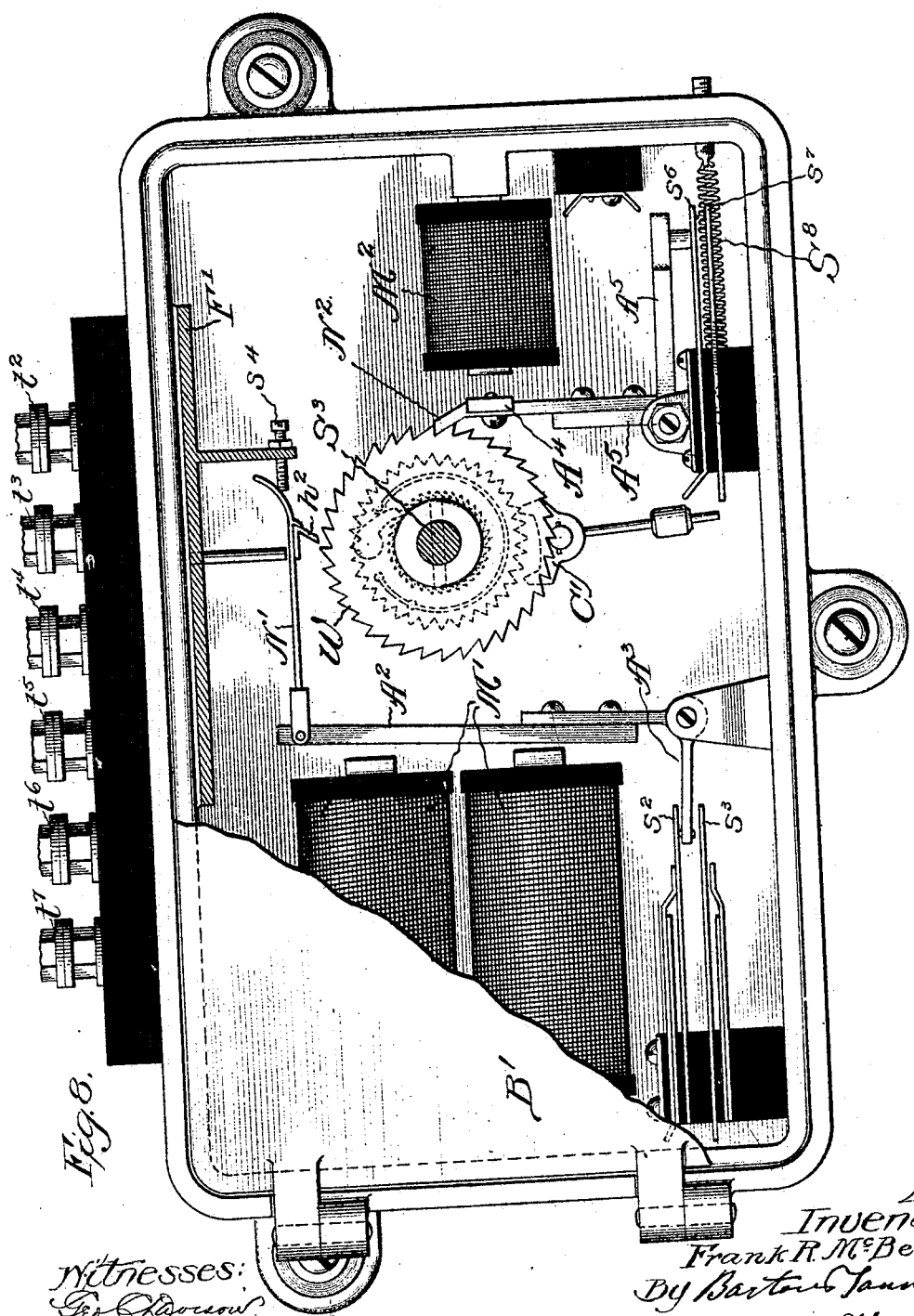

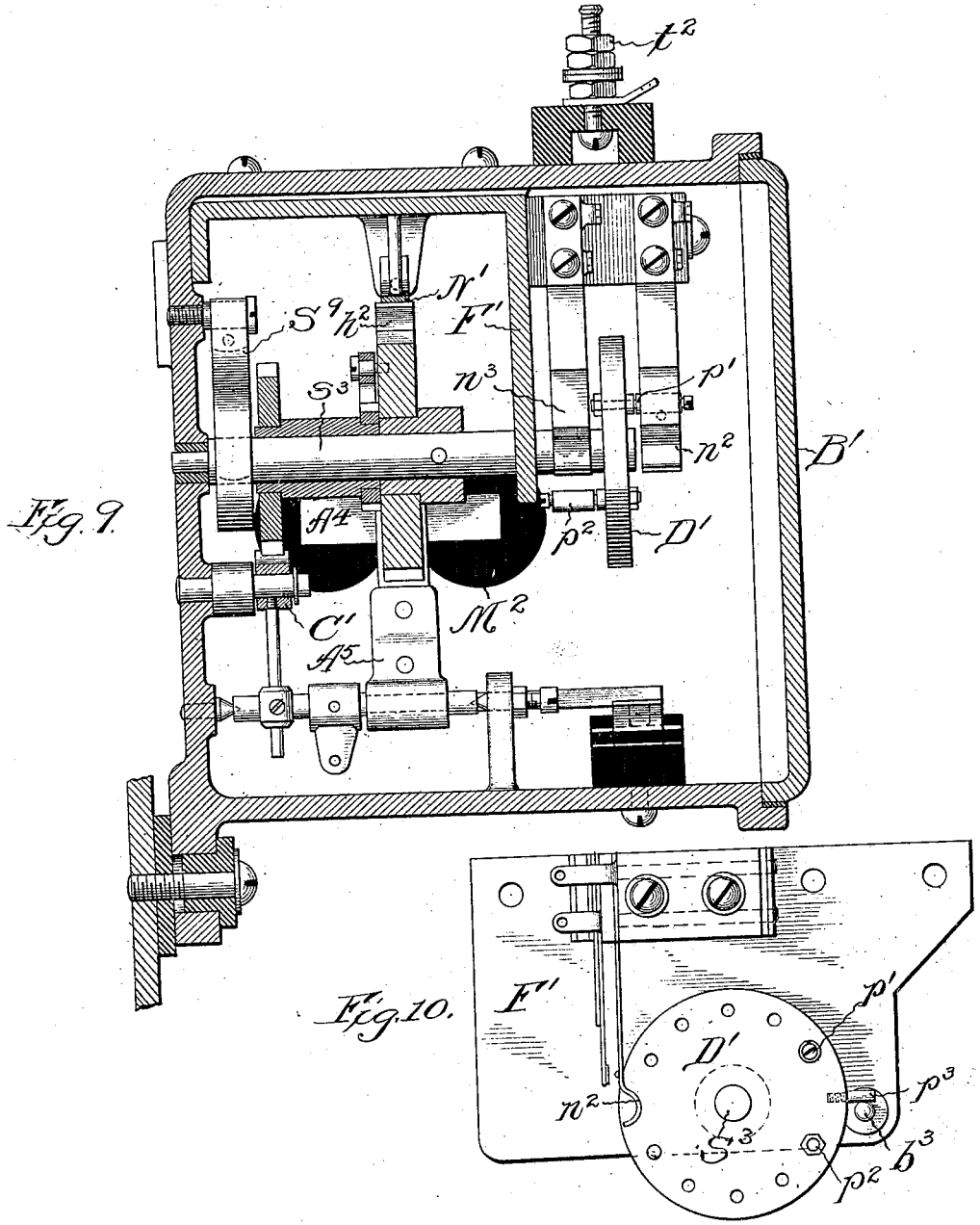

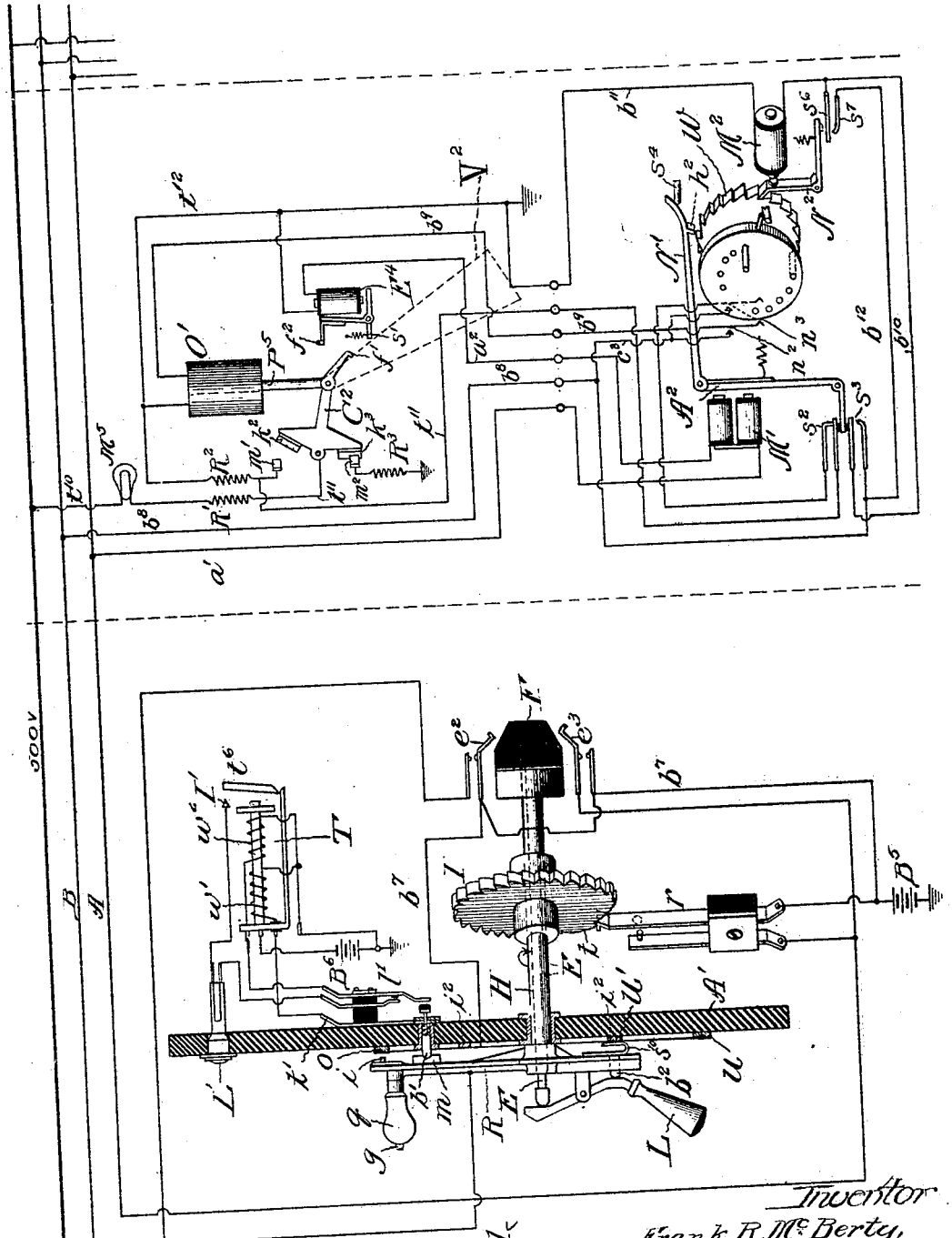

No. 830,247. PATENTED SEPT. 4, 1906.
F. R. McBERTY.
SELECTIVE SIGNAL SYSTEM FOR RAILWAYS.
APPLICATION FILED JULY 24, 1905.
12 SHEETS—SHEET 10.
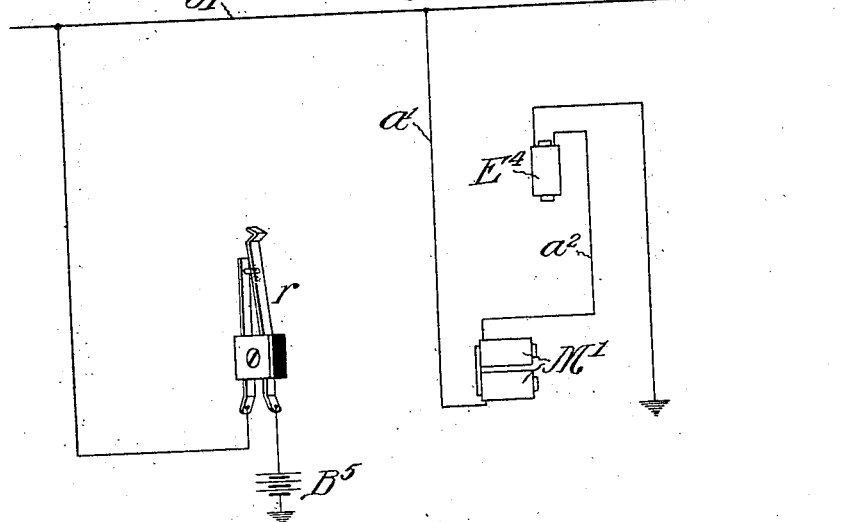
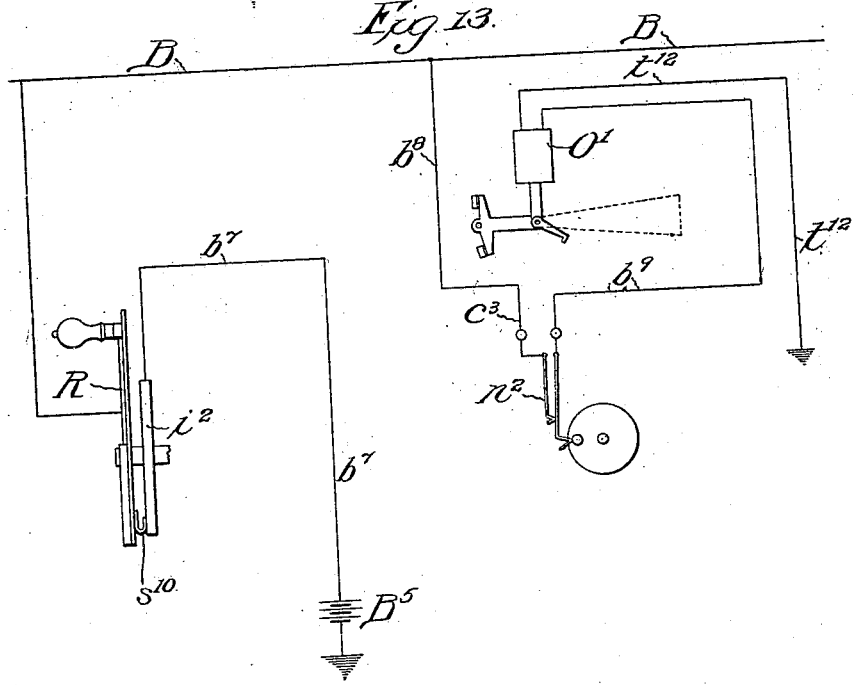
Witnesses:
Geo C Davison
A H Moore
Inventor:
Frank R. McBerty.
By Barton Tanner
Attys.

No. 830,247. PATENTED SEPT. 4, 1906.
F. R. McBERTY.
SELECTIVE SIGNAL SYSTEM FOR RAILWAYS.
APPLICATION FILED JULY 24, 1905.

12 SHEETS—SHEET 11.

Witnesses:
Geo. C. Dorson.
A. H. Moore.

Inventor
Frank R. McBerty
By Barton & Sumner
Attys.

No. 830,247. PATENTED SEPT. 4, 1906.
F. R. McBERTY.
SELECTIVE SIGNAL SYSTEM FOR RAILWAYS.
APPLICATION FILED JULY 24, 1905.
12 SHEETS—SHEET 12.
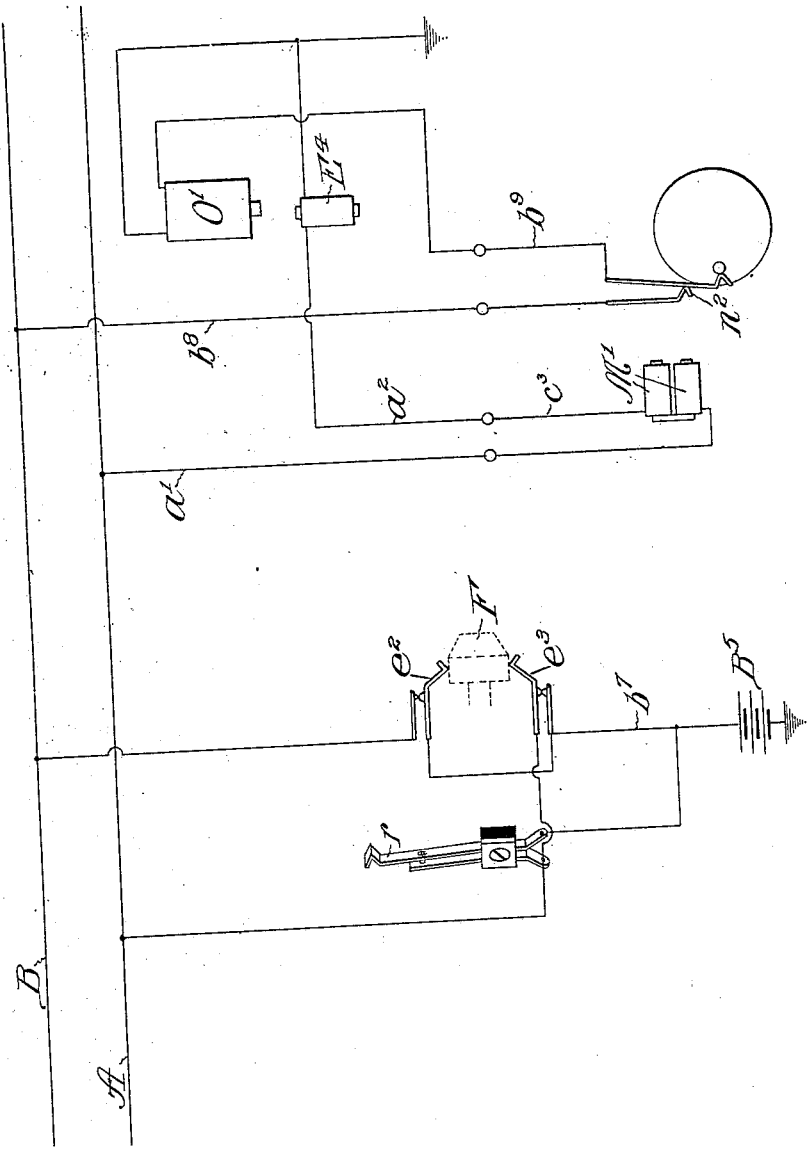

UNITED STATES PATENT OFFICE.

FRANK R. McBERTY, OF EVANSTON, ILLINOIS, ASSIGNOR TO WESTERN ELECTRIC COMPANY, OF CHICAGO, ILLINOIS, A CORPORATION OF ILLINOIS.

SELECTIVE SIGNAL SYSTEM FOR RAILWAYS.

No. 830,247.　　　　　Specification of Letters Patent.　　　　Patented Sept. 4, 1906.

Application filed July 24, 1905. Serial No. 271,068.

*To all whom it may concern:*

Be it known that I, FRANK R. McBERTY, a citizen of the United States, residing at Evanston, in the county of Cook and State of Illinois, have invented a certain new and useful Improvement in Selective Signal Systems for Railways, of which the following is a full, clear, concise, and exact description.

My invention relates to a railway signaling system and apparatus therefor, and more especially to a system and apparatus for use on railways operated by electricity where it is desired to selectively set signals at various points along the track.

Heretofore in systems of this kind the operation of setting a signal has required a multiplicity of movements by the central-station operator, the apparatus has been crude and not fully developed, and the test-signal with the lighting of the semaphore has been solely under the control of the set semaphore and once having been given could not be repeated. The restoring of the semaphore to its normal position has been by manual means requiring some one at the substation. These systems have therefore been clumsy and subject to errors, making them unreliable.

The object of my invention is to provide an improved system and apparatus which shall be reliable, requiring a minimum of movements to effect the desired operation of the signal, these movements being interlocking to prohibit errors; to construct apparatus which is positive in its action, not easily gotten out of order, and is simple and compact.

A further object of my invention is to provide a test-circuit under the control of the semaphore, whereby the operator after having set a semaphore can test at any time and be informed of the position of the semaphore-arm and the condition of the signal-lamp in the semaphore-box.

The circuit of my improved system comprises two lines with ground returns connecting a central station with a plurality of signaling or substations for selecting, setting, and restoring the signals; and a circuit branched to ground from a relatively high-voltage connection for testing. In other words, the three principal elements of the circuit are the two lines and a test-circuit.

It will be understood that the operator is provided with means by which he may select any one of several stations along the route of the trains which are under his direction, and having made the selection is able to disclose or withdraw the signal—in this instance a semaphore and signal-light—at will.

The apparatus at the station of the operator—that is, at the central office—I have termed the "selective apparatus" or "selector."

The apparatus at a substation or point at which signals are to be given consists of a signal-setting mechanism and a selecting mechanism coöperating therewith. This apparatus is so arranged that the operator, who will know the location of the different trains, may give such signals as may be required from time to time and get in communication by telephone or otherwise with the conductors to give more specific orders as occasion arises.

My invention will be more readily understood by reference to the accompanying drawings, in which—

Figure 2:
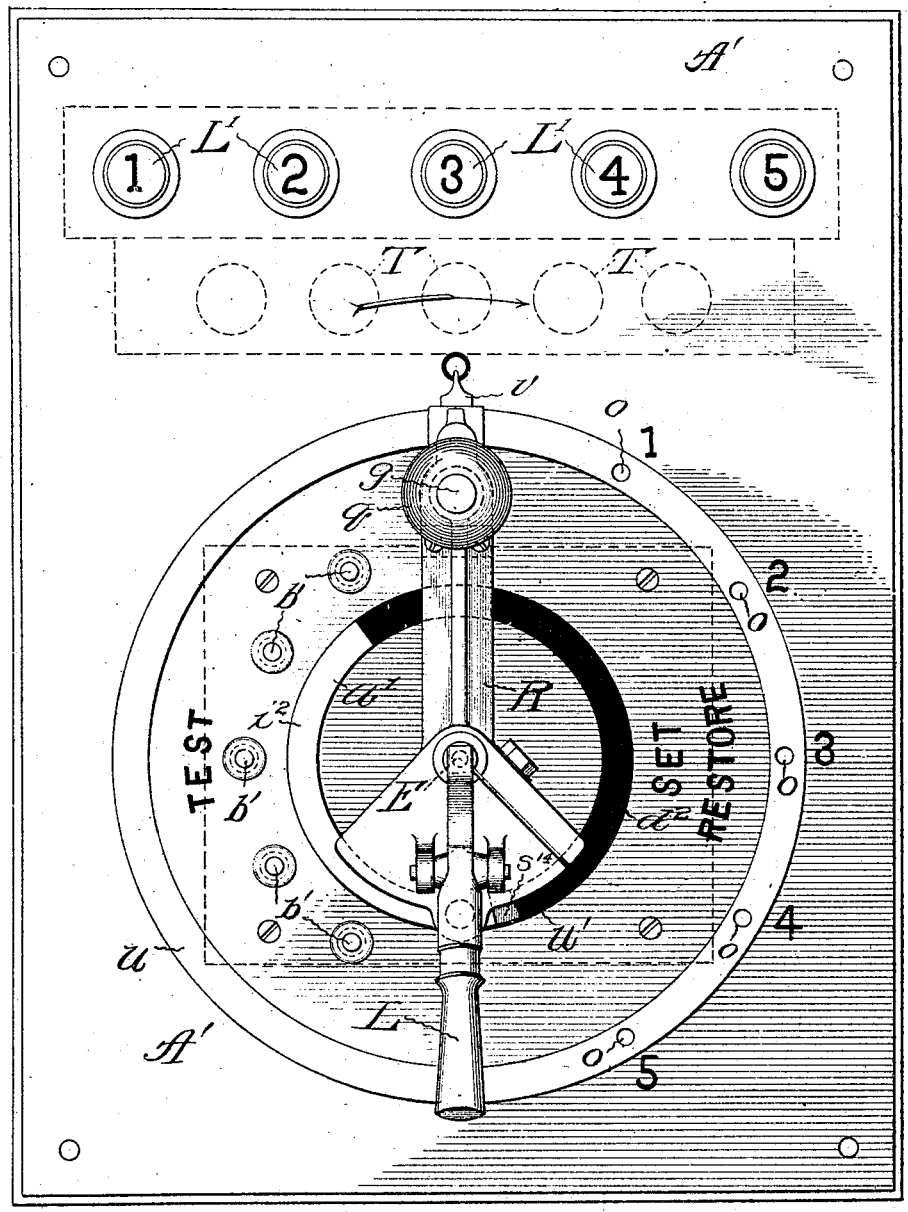
Figure 4:
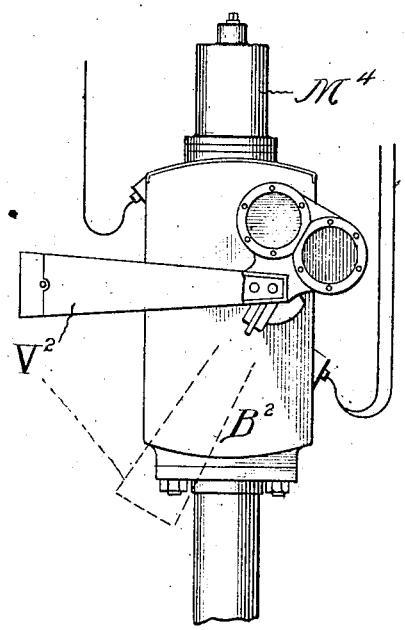
Figure 3:
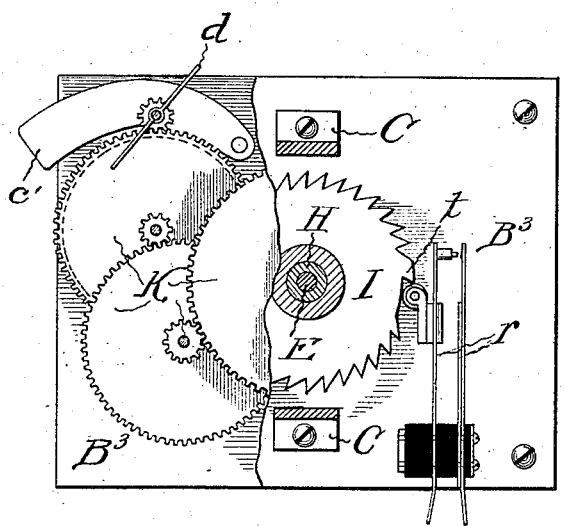
Figure 5:
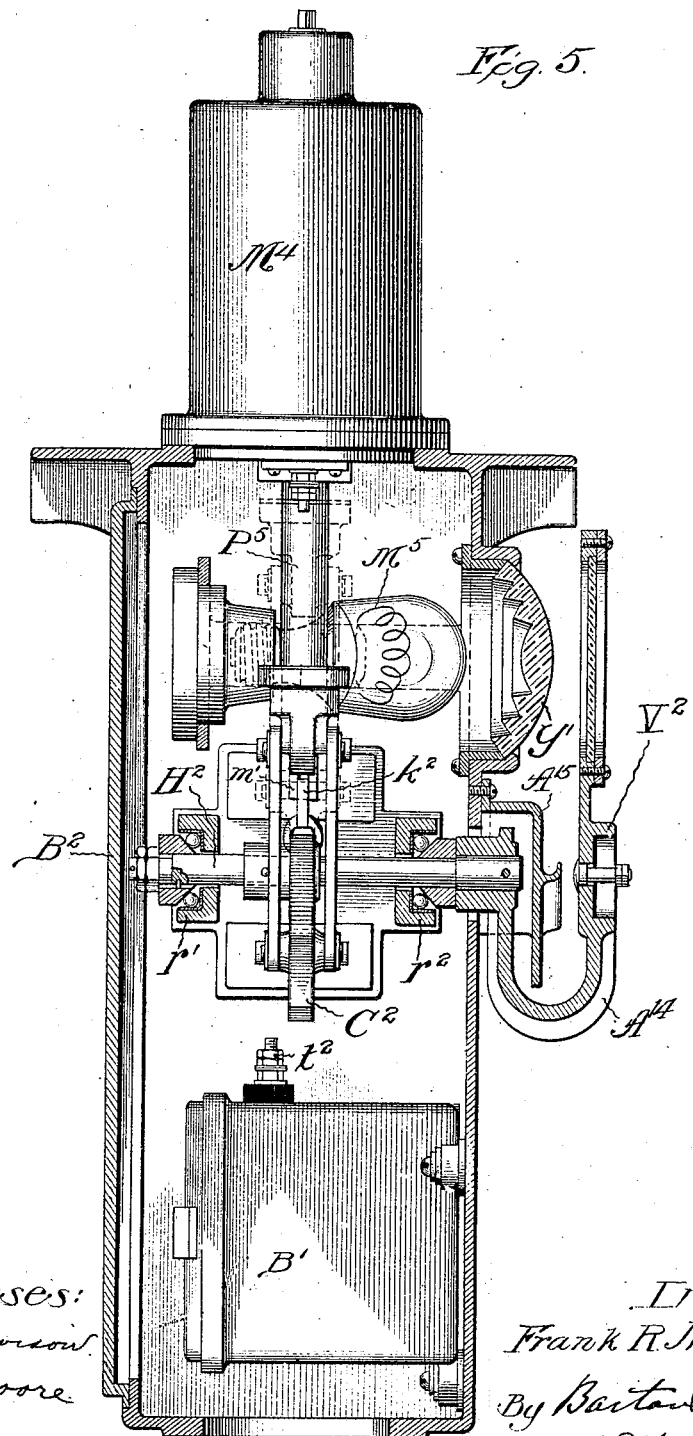
Figure 14:
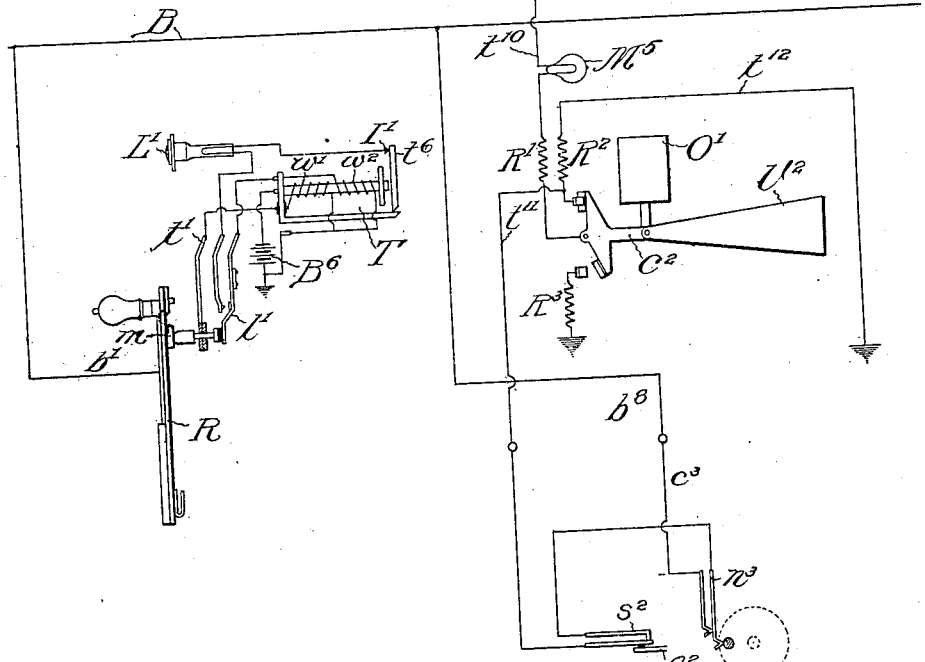
Figure 15:
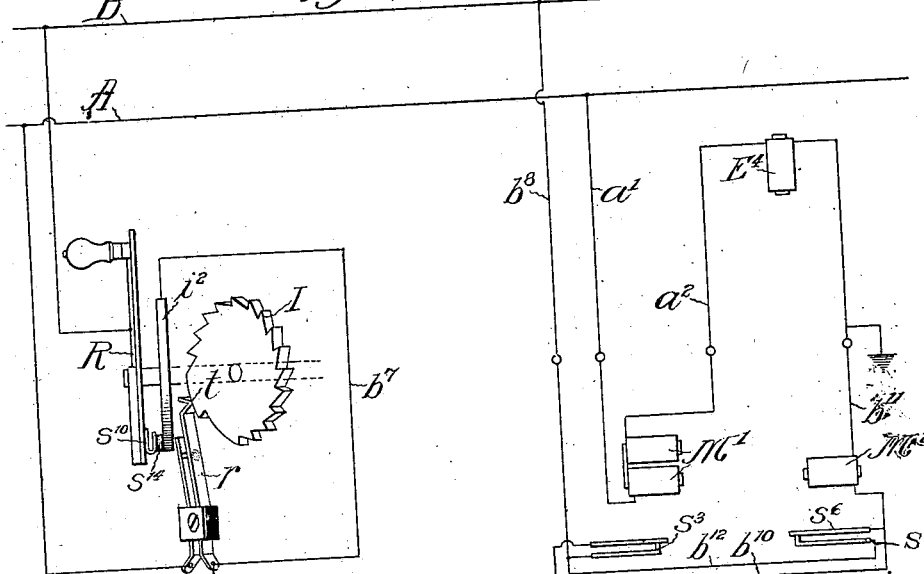

Figure 1 is a sectional side elevation of the central-station selector. Fig. 1ª is a detail view of the cam mechanism for releasing the plunger, as seen from line *x x*, Fig. 1. Fig. 2 is a front elevation of the central-station selector. Fig. 3 is a view in detail of the switch-springs and operating-ratchet of the selector. Fig. 4 is a view on a reduced scale in elevation of a substation apparatus. Fig. 5 is a sectional side elevation of the same on a larger scale, showing the signal-setting mechanism with the case containing the selecting device below. Fig. 6 is a front elevation of the semaphore mechanism partially in section, showing the signal-setting mechanism. Fig. 7 is an isometric view in detail of the selecting device, the casing being broken away and the cover thereof removed. Fig. 8 is a front elevation of the same. Fig. 9 is an end elevation of the selecting device, the case and some of the parts being shown in section. Fig. 10 is a side view in detail of the selecting-wheel. Fig. 11 illustrates the circuits between the apparatus at the operator's office and the apparatus controlled thereby at one of the substations. Fig. 12 is a diagram illustrative of the circuit completed to operate the selecting or determining wheel. Fig. 13 is a diagram showing the conditions of the circuit when the selecting-wheel has closed its contact and the semaphore is displayed. Fig. 14 is a diagram of the test-circuit. Fig. 15 shows the circuit which is made to restore the selecting device automatically, and Fig. 16 is a diagram illustrative of the circuit formed when the semaphore is released.

Like parts are indicated by similar letters throughout the different views.

Referring to Figs. 1, 1ª, 2, 3, and 11, A' of insulating material, such as slate, forms the mounting. Framework B³ is mounted on the rear of the plate A' and supports a yoke C, which has a tubular extension D, through which a rod E is adapted to slide and insert its wedge-plunger F, of insulating material, between switch-springs $e^2$ $e^2$. The rod E is normally forced out by the spring S, inclosed in the extension D.

A cam-plate G is mounted to slide vertically in the yoke-piece C. It is provided at its center with an opening $h$, through which the rod E slides. On the rod E is mounted a conical-shaped piece $c$, carrying a pin $p$. Normally a tooth $s$ of the cam-plate G is in line with the pin and prevents the rod from being pushed in. When, however, the rod is rotated, the tooth is no longer in the path of the pin, and the rod E may be depressed, causing the piece $c$ to raise the cam-plate G and to pass through the opening $h$, whereupon the plate G drops down and retains the rod E depressed, but at the same time allows it to rotate. A pin $e$ on the plate G is adapted, under conditions to be described later, to be engaged by the cam-roller $n$, so as to raise the cam-plate G and release the piece $c$, whereupon spring S returns the rod to its normal position.

A shaft H, rotatably mounted in the plate A', carries at its rear end a toothed wheel I, one tooth $t$ of which is longer than the others. A pair of switch-contact springs $r$ are arranged to ride over the teeth of the wheel I. A radial arm $k$, fast to the hub of the wheel I, carries a support for the cam-roller $n$. To control the movement of the shaft H is a train of gears K, with a retarding-vane $d$ and weighted friction-clutch $c'$, arranged so as to permit rotation of the train of gears in a right-hand direction only.

At the front end of the shaft H and secured to it is an arm R, adapted to travel over the face of an annular plate U on the front of the plate A'. In the right-hand portion of the plate U there is a series of holes $o$, with which a pin $i$, carried by a spring-actuated lever $v$, is arranged to engage as the arm R swings around the circle. The holes $o$ are numbered as shown in Fig. 2, to correspond to the several signals on the line. In this case there are five signals. The handle $q$ on the arm R carries a button-plunger $g$, bearing against one end of the lever $v$, for withdrawing the stop-pin from a hole and so release the arm. A lug $m$ is secured to the under side of the arm R so as to pass over a series of plunger-buttons $b'$ when the arm is rotated and force them down momentarily to break the contacts of switch-springs $l'$. A terminal $t'$ forms a circuit connection for the plunger-button $b'$ itself. The arm R also carries a pivoted lever L, one end of which bears against the rod E and the opposite end of which bears against a small plunger-button $b^2$, engaging a spring $s^{10}$. The rounded end of the spring moves in proximity to a ring U', concentric with the ring U and formed of a metallic piece $i^2$ and an insulating-piece $d^2$.

A series of relays T, each with an actuating and a locking winding, are mounted, as shown, on the rear of the plate A'. The relays are connected in circuit with a series of signal-lamps L', set into the face of plate A' and numbered to correspond to the signals at the substations.

Referring now to Fig. 4 et seq. the selecting device and mechanism for operating the semaphore V² at the substation are located in an iron semaphore-box B², which is usually mounted on a pole in a conspicuous place, so that the motorman may see the signal.

The selecting device is inclosed in a separate case B', removably mounted in the interior of the semaphore-box B². A shaft S³, supported by a framework F' in the case B', carries a toothed wheel W, the teeth of which are engaged by two pawls N' and N². Pawl N' is pivoted to the free end of the armature A² of a magnet M'. The armature is fastened to one arm of a bell-crank lever, the other arm A³ of which extends between switch-contact springs $s^2$ $s^3$ and is adapted, when the magnet is energized, to open contact of $s^2$ and close contact of $s^3$. The circuit connections of these springs will be explained hereinafter. The pawl N' normally has its prong $h^2$ withdrawn from the path of the teeth of the wheel W, this being caused by the curved end of the pawl resting upon a screw $s^4$, supported by a lug attached to the frame F'. The pawl N² is controlled by an armature A⁴ of a magnet M², mounted on the side of the case. The pawl N² is fastened to one arm of a bell-crank lever the other arm A⁵ of which is arranged when the magnet is energized to close contact of switch-spring $s^6$ with switch-spring $s^7$. A spring S⁸ normally forces the pawl N² into engagement with the wheel W, holding it against a backward rotation which is caused by the coil-spring S⁹.

C' is an escapement mechanism to control the movement of the wheel W.

The front end of shaft S³ carries a disk D', provided with two projecting pins $p'$ and $p^2$, mounted on opposite faces of the disk. The location of the pins on the disk is relatively different for each station and comprises the selective adjustment of the apparatus. A pin $p^3$, projecting from the periphery of the disk D', rests against a stop-bar $b^3$, mounted on the frame, and prevents the disk and shaft from rotating backward past their normal position. Two sets of switch-springs $n^2$ $n^3$ are mounted on the framework F' and project into the path of the pins $p'$ and $p^2$, respectively. When the disk is rotated, the pins are adapted to move the springs to close their contacts. Binding-posts $t^2$ $t^3$, &c., are provided on the exterior of case B' for connection with the apparatus contained therein. A hinged cover for the case forms a means of ready access to the contained mechanism. It will thus be seen that the selecting device forms a unit mechanism which can readily be removed from the semaphore-box and be replaced by a new one in case of its derangement.

In the upper part of the semaphore-box $B^2$ is mounted the signal-setting mechanism. A cylindrical compartment $M^4$ is mounted on top of the box and contains a solenoid O'. The plunger $P^5$ of the solenoid is connected by links $l^2$ to crank $C^2$, which is rigidly fastened to shaft $H^2$, pivoted in bearings $r'$ $r^2$ on the side of the box $B^2$. The crank $C^2$ has a projection $j$, which normally rests against a stop $O^4$ and holds the semaphore in a position which I shall designate the "clear" position. A lip $f'$ on the end of the crank $C^2$ is adapted, when the crank is drawn up, to lock with a second lip $f^2$, carried by one arm of a weighted bell-crank lever $L^3$, which normally holds it out of the path of the lip $f'$, but which is adapted to be moved into its path, as shown in dotted lines in Fig. 6, by an electromagnet $E^4$, mounted on the box $B^2$. The crank $C^2$ also carries two contact-blocks $k^2$ $k^3$, arranged to make connection with spring-terminals $m'$ and $m^2$, respectively. The contacts $k^3$ and $m^2$ are closed when the crank is in its normal position and contacts $k^2$ and $m'$ are closed when the crank is drawn up. These contacts, as shown in Fig. 11, control the current through the lamp $M^5$ for lighting the signal. Normally the lamp is lighted and is included in a branch from the high-potential circuit to ground through contacts $k^3$ $m^2$; but when the signal operates the lamp is lighted through the high-potential circuit grounded instead through contacts $k^2$ $m'$, through which circuit also the test-current is taken.

The shaft $H^2$ projects through the semaphore-box and carries at its end an arm $A^{14}$, provided with a semaphore-vane $V^2$ and the usual colored windows through which the bull's-eye lens Y', lighted by the lamp $M^5$, throws a strong light to indicate at night the position of the vane.

Referring to Fig. 11 et seq. the operation of my system and apparatus will be described as follows: Suppose it is desired to set a semaphore at some point along the track, let us say at signal No. 5. The central-station operator will depress the thumb-button $q$, which lifts pin $i$ from the hole in which it is resting and moves the arm R of the selector in a right-hand direction around its face until it is over hole No. 5 of the circular plate U. He will then allow the pin to drop into the hole which locks the arm at that position. In swinging the arm around the toothed wheel I makes and breaks the circuit at the contact-springs $r$, so that a series of impulses of current are sent over the line from battery $B^5$, through switch-springs $r$, over line A $a'$, magnet $M^7$, line $a^2$, magnet $E^4$ to ground, this portion of the circuit being shown diagrammatically in Fig. 12. This energizes the magnets M' and $E^4$ of all the substations, causing them to attract their armatures. Armature $A^2$ of magnet M' moves the pawl N' and allows its curved end to ride down off screw $s^4$. The prong $h^2$ of the pawl engages the teeth of the ratchet-wheel W and steps the ratchet-wheels at all the substations around a number of times equal to the number of impulses sent over the line. In this movement the pin $p'$ on the disk D' of station No. 5 will be carried far enough around to close the contact of the switch-spring $n^2$, but the pins at all the other stations will not close their contact, as they occupy different angular positions on the disk D'. The armature of magnet $E^4$ remains attracted as long as the arm R remains locked at position No. 5, because the teeth of the ratchet-wheel I and the arm R are so relatively arranged that whenever the arm is held in position over any one of the holes O by the pin $i$ one of the teeth of the ratchet-wheel will be in position to press the contact-springs $r$ together to maintain the circuit closed. The lip $f^2$, carried by the armature of magnet $E^4$, is thereby projected in the path of the lip $f'$ on the crank $C^2$. The operator now depresses the handle L on the arm R, forcing the button $b^2$ down, causing the spring $s^{10}$ to make contact with segment $i^2$ of the inner ring U' on the face of plate A. This completes circuit, as shown in Fig. 13, from battery $B^5$ through $b^7$, segment $i^2$, spring $s^{10}$, arm R, line B $b^8$ $c^3$, contact $n^2$ $b^9$, solenoid-magnet O' and $t^{12}$ to ground. The solenoid-magnet O' becomes energized and draws up its core $P^5$ and by means of the link $l^2$ and crank $C^2$, which are connected to the core, the arm $A^{14}$, which carries the vane $V^2$, is drawn up and locked by the engagement of the lip $f'$ with the lip $f^2$. The vane $V^2$ is now displayed to indicate "danger." The drawing up of the solenoid-core $P^5$ also causes crank $C^2$ to break contacts $m^2$ and $k^3$, which when closed complete a circuit from a high-voltage trolley-line through $t^{10}$, lamp $M^5$, resistance R', contacts $m^2$ $k^3$, resistance $R^3$ to ground, and to close contacts $m'$ and $k^2$, which transfer the normal ground through resistance $R^3$ to an auxiliary ground through resistance $R^2$ and conductor $t^{12}$. The operator after having set the semaphore, as described above, withdraws the pin $i$ from the hole No. 5 and continues the movement of the arm R round toward its zero position, which movement will send impulses of current over the line A to again step forward the ratchet-wheels W of the selecting devices until the pin $p^2$ at signal No. 5 closes the contact $n^3$. At the same time the button $b'$ corresponding to signal No. 5 will be depressed by the lug $m$ on the arm R as it passes the button on its way to zero position. A circuit from the high-voltage trolley-line will thus be closed through $t^{10}$ $R'$ $t^{11}$, contacts $m'$ $k^2$, contact $s^2$, contact $n^3$ $c^3$ $b^8$, back over the line B to the arm R of the selector, button $b'$, spring $t'$, magnet winding $w'$ of the relay T to ground. A diagram of this circuit is shown in Fig. 14. The resistance $R'$ has sufficiently reduced the current tapped off from the high-voltage line to permit its use in the local circuit of the selector. The energization of the winding $w'$ of the magnet T' will cause it to draw up its armature $t^6$, closing the local circuit of the lamp L', this circuit being easily traced from the positive pole of battery $B^6$, through locking-winding $w^2$, contact $l'$ (which will be closed, the arm R having by this time passed over the button $b'$,) lamp L', armature contact $l'$, and the magnet-frame back to battery. The locking-winding $w^2$ will thus maintain the local circuit closed and the lamp L' in a lighted condition until the contact $l'$ is broken again, as will be described hereinafter. It will thus be seen that it is impossible to get connection to the outside high-voltage line unless the semaphore has been set, and having been set the above-described test-circuit is established and the lighting of lamp L' indicates that the signal has been set, that the lamp $M^5$ is lighted, and that the high-potential trolley-current is on the line. If any one of the above conditions were not fulfilled the lamp L' would fail to light when the arm passed over the button $b'$, which would indicate that there was either no current on the trolley-wire or that the lamp $M^5$ was out, or that the semaphore had failed to operate. As the arm R approaches the zero position the contact-springs $r$ are held closed by the long tooth $t$ on the ratchet-wheel I, maintaining the circuit shown in Fig. 12 closed, which includes the magnets M' and $E^4$, thus closing the contact $s^3$. At the same time spring $S^{10}$ makes contact with a raised spot $s^{14}$ on segment $i^2$, which then throws current in the portion of circuit shown in Fig. 15—to wit, from battery $B^5$ $b^7$ $s^{14}$ $s^{10}$, arm R, line B $b^8$, contact $s^3$ $b^{10}$, magnet $M^2$ $b^{11}$ to ground—thus holding back the pawl $N^2$ and closing contact springs $s^6$ $s^7$ together to short-circuit contact $s^3$ to maintain current in magnet $M^2$ when magnet M' releases its armature and opens contact $s^3$. As the arm R continues its revolution the contact at $r$ is opened again, thereby deënergizing magnet M' and releasing its armature $A^2$, and the curved end of pawl N' rides up on screw $s^4$ and withdraws $h^2$ from the ratchet-wheel W, which, under the influence of spring $s^9$, returns to its zero position with pin $p^3$ resting on stop $b^3$ as both pawls N' and $N^2$ are withdrawn. The arm R has now returned to and stopped at its zero position.

Let us assume that the operator has gone through the above moves and has correctly set the semaphore at signal-station No. 5 and that he has received the test-circuit indicating that the danger position is shown and that the lamp is lighted at that signal. He desires to release the semaphore. He again rotates the arm right-handed to hole No. 5, sending impulses over the line and closing the contact $n^2$ at signal No. 5 by the pin $p'$, the circuit being as heretofore described. He now raises the lever L, which depresses the plunger F, the cam G operating, as previously described, to hold F depressed, and forces out the switch-springs $e^2$ $e^3$ to close their contacts. This applies current over the circuit shown in Fig. 16, from battery $B^5$, through $b^7$, one branch going through contacts $e^3$, over line A $a'$, magnet M', $c^3$, $a^2$, magnet $E^4$ to ground, the other branch going through contacts $e^2$ over line B $b^8$, contact $n^2$ $b^9$, solenoid O' to ground. The energization of the solenoid causes it to draw up its plunger sufficiently to raise the lip $f'$ out of engagement with lip $f^2$, so that when magnet $E^4$ is deënergized the lip $f^2$ will be withdrawn by the spring $s^{15}$ out of the path of lip $f'$ and the semaphore-arm will be free to drop to the clear position when the solenoid O' is deënergized. The arm R is continued in its rotation and brought around to the zero position, but the selecting devices at the signal-boxes do not move, however, as the springs $r$ are short-circuited at $e^3$, and the contact $n^2$ at the signal No. 5 thus remains closed. As the arm approaches zero the lug $m$ depresses the button $b'$ and breaks the lamp-circuit at $l'$, releasing the armature $t^6$ of the magnet T, and as the test-circuit is open at contact $n^3$ the armature remains unattracted and the lamp is extinguished. As the arm R approaches its zero position the plunger E is unlocked by cam-plate G and by means of spring S is returned to its normal position, breaking contacts $e^2$ and $e^3$, thereby opening the circuits of solenoid O' and magnet $E^4$. The solenoid O' releases the semaphore, which has been unlocked as heretofore explained. At the same time the spring $s^{10}$ engages the raised portion $s^{14}$ and completes a circuit for magnet $M^2$, which withdraws pawl· N² from ratchet W. The arm R now opens contacts r and breaks the circuit of magnet M, releasing armature A². The ratchet and pin carrying disk are now returned by their spring to normal position.

It will thus be seen that I first use line A, over which and through a ground return impulses of current are sent from the central station to operate the step-by-step selective devices in the substation semaphore-boxes to set only the mechanism of the signal-station whose semaphore it is desired to operate, this current being left on the line A to energize a locking-magnet which is arranged to lock the semaphore after it has been set in the danger position. I then momentarily send current over line B and a ground return to energize a solenoid and set the semaphore to indicate "danger" where it is thus locked by the locking-magnet. The setting of the signal at this position shifts the normal ground of a branch circuit containing a lamp (the branch being connected from the external circuit of relatively high voltage) to an auxiliary ground from which, after the shifting of ground connections occurs, is tapped off and sent over line B sufficient current to operate at the central station a relay designed to close and lock a local circuit containing a lamp. Thus a test-circuit is formed which notifies the operator of the operation of the semaphore and the condition of its lamp. I then make use of both lines A and B, which are used together to operate simultaneously the magnets controlling the step-by-step mechanisms and to finally restore these mechanisms to their normal positions at all the signaling-stations. The final operation again uses both lines A and B together, over which currents are sent to operate the semaphore-solenoid and the locking-magnet to unlock and release the semaphore, which drops to the clear position when both the solenoid and magnet are deënergized, said solenoid restoring the normal ground to its lamp-circuit, which keeps the lamp lighted, but breaks the test-circuit and permits the breaking of the local circuit to extinguish the test-lamp. Thus one set of magnets is operated by current sent over one line and another set is operated by current sent over a second line separate from the first line and entirely unaffected by current changes in the first line, and both lines operated simultaneously are necessary for operating both sets of magnets to restore the apparatus to its normal condition. It will also be noted that the test-current is derived from an external source, which, before it can be used, requires the operation of the semaphore.

One of the novel features of my selector consists of the single unidirectional rotating arm, which in one revolution performs four operations. First, it causes the interrupter to send the impulses over the line to operate the substation selecting devices to select the desired station; second, it places an auxiliary switch carried by the arm in position to apply current to set the semaphore at the selected station; third, it automatically receives test-current from the substation selected and applies it to a local circuit for operating a visual signal, and, fourth, it automatically restores the substation selecting devices to their zero or normal position. A subsequent revolution of the arm is made to set again the substation selecting devices so that a second auxiliary switch, also on the revolving arm, can be operated to apply current over the two lines to release the semaphore and to remove the test-signal and leave the system in its normal condition.

The selecting devices at the substations, it will be noted, are adapted to coöperate with the central-station selector for stepping forward synchronously at all the stations a ratchet-wheel operated by an electromagnet to close a local contact at the selected station only, making it possible to send a current to the signal-setting mechanism of the selected station, a further stepping forward of the wheels closing the second local contact at the selected station so as to send the test-current back to the central station. The unlocking-magnet operating simultaneously with the actuating-magnet allows the spring to restore to normal the ratchet-wheel, and a second step-by-step movement places the circuits in position to release the signal, after which the selecting device itself returns to zero position.

In the third mechanism of my improved system, which is the signal-setting mechanism, consisting of the solenoid and locking-magnet adapted to receive current through the coöperation of the selector and substation selecting device to draw up the semaphore and through a locking-detent to retain it in its set position, I have arranged a switch on the signal-arm to transfer a normal ground to an auxiliary ground for giving the test-current through the semaphore-lamp from the external high-voltage source.

It will be observed that the U-shaped arm A¹⁴, which supports the semaphore-arm, is combined with the hood A¹⁵ over the pivotal support of the arm, the said hood A¹⁵ having inclined troughs on its face extending beyond the range of movement of the arm A¹⁴ to prevent the formation of icicles within such range.

Having thus described my invention, I claim as new and desire to secure by Letters Patent—

1. In a selective signaling system, the combination with the main selector-arm at the central office, of a test-circuit containing two points of control, one point of control being adapted to be closed in the setting of the semaphore, and the other point of control by the movement of the selector-arm after the semaphore has been set, said circuit being connected with a source of current, a lamp-signal L', a relay T with its windings and contact adapted to close and lock the relay and bring the lamp into circuit to illuminate the same on the further movement of the arm, substantially as described.

2. In a selective signaling system, the combination with the main selector-arm at the central office, of a test-circuit adapted for connection to one of a plurality of substations, said test-circuit having two points of control, one point of control located at the substations and governed by the movement of the semaphores, the other point of control being operated by the movement of the selector-arm, said test-circuit being connected with a source of current in the operation of the semaphore at the connected substation and a local circuit at the central office adapted to operate a signal through the energization of the test-circuit, substantially as described.

3. In a selective signaling system, a source of current with a test-circuit under the control of one of a plurality of semaphores and the main selector-arm, the movement of the semaphore acting to close one of two controlling-points and a subsequent movement of the selector-arm operating to close the other of said controlling-points, said test-circuit being associated with a lamp-signal L', a source of current and a relay T with its windings adapted to close and lock the relay and bring the lamp-signal into circuit to display the same, substantially as described.

4. In a selective signaling system, the combination of the main selector at the central office, of a test-circuit associated with a local selector-circuit and a substation-semaphore, said test-circuit being under the joint control of the movements of the main selector and the substation-semaphore, said movements being in sequence, the said semaphore being adapted to move in advance of the selector, whereby the test-circuit is closed to energize the local selector-circuit and display a test-signal at the central office, substantially as described.

5. The combination with the selector-circuit, of an interrupter-wheel I provided with a broad tooth $t$, a contact-spring $r$ adapted to ride on said broad tooth to hold said circuit closed, an electromagnet M' at a substation maintained energized while the said spring $r$ is thus holding the circuit closed, thereby maintaining a pawl N' in position to prevent the return movement of a selecting device, a ratchet-wheel, an electromagnet $M^2$ having its pawl $N^2$ adapted to engage with said ratchet-wheel when said electromagnet is deënergized, a circuit including the said electromagnet $M^2$ controlled by a contact $s^3$ held closed while the spring $r$ is riding over tooth $t$, a second contact or point of control $s^{14}$, and a short-circuiting device $s^6$ controlled by magnet $M^2$ to maintain a circuit around contact $s^3$ when magnet M' is deënergized after the broad tooth $t$ has passed from under spring $r$, whereby the selecting device is released and allowed to return to its zero position.

6. A releasing-circuit for selective signaling systems comprising two lines connecting a central office with a substation, a selecting device at the substation controlled by two electromagnets M' and $M^2$ connected with the respective two lines, the connection of the said electromagnet $M^2$ with its line being controlled by a switch $S^3$ controlled by the other of said electromagnets, circuit connections associated with the said switch to prevent the same from controlling said second electromagnet $M^2$, a source of current and automatic means at the central office for applying current from said source to both of said lines at the same time but adapted to remove current from one of said lines to deënergize the electromagnet connected therewith, before the removal of current from the other line, whereby said selecting device is released from the control of the electromagnets and returns to zero, substantially as described.

7. In a selector-circuit, two lines A and B connecting a central office with a plurality of substations, a source of current and means for applying current from said source to both of the lines simultaneously, and adapted for the unsimultaneous withdrawal of said current from said lines, in combination with electromagnets controlling a selecting device at the substations, said magnets being connected in the respective two lines and associated together by circuit connections, to maintain current through some of the magnets after the others have been deënergized through the unsimultaneous withdrawal of the current from the two lines, whereby the selecting devices are released and allowed to return to their zero positions.

8. In a selector-restoring circuit, a source of current at a central office, two lines and means for applying said source to said lines, said means adapted to apply current over one of the lines for a predetermined interval of time and to simultaneously apply current over the other line for a longer interval of time, said first line being associated with substation apparatus to effect the application of the current to the second line after the circuit of the first line is broken, said associated apparatus controlling a selecting device adapted to be released by the removal of the current from the line at the end of the shorter interval of time whereby the selecting device is released.

9. The releasing-circuit including the points of control $e^2$ $e^3$ at the central office, and a point of control $n^2$ at the substation, in combination with means for closing the said points of control at the same time to cause current to traverse the electromagnetic device $O'$ which controls the semaphore, and means at the central office for opening the contacts $e^2$ $e^3$ to withdraw current from said circuit, substantially as described.

10. In a signaling system, a semaphore releasing or restoring circuit having controlling-points at both the central office and substation, means for closing the substation point of control and then subsequently closing the points of control at the central office, a source of current for said circuit, sent over the circuit upon the simultaneous closure of all the controlling-points to energize the substation signal device and means for automatically opening the central-station controlling-points to open the circuit, substantially as described.

11. In a releasing-circuit for a selective signaling system, two points of control, one at the substation and one at the central office, the operation of the substation controlling-point being governed by a selecting device whose circuit is ineffective for selecting upon the closure of the central-office controlling-point, a signal device at the substation in said releasing-circuit and a lock for said signal device, said device being energized upon the simultaneous closure of the two controlling-points and means at the central office for opening the controlling-points thereat and releasing the lock and signal, substantially as described.

12. In a releasing-circuit, two lines A and B with a common source of current, two points $e^2$ $e^3$ at the central office controlling the application of current from said source to the two lines, a point of control $n^2$ at the substation coöperating with point $e^2$ at the central office to cause current to traverse line B to operate the substation-semaphore electromagnetic device, means for closing the point of control $n^2$, means controlled by the application of current over the other line A through the point of control $e^3$ to maintain closed the point of control $n^2$ at the substation, means at the central office for opening the contacts $e^2$ $e^3$ to withdraw current from said releasing-circuit to release said semaphore, substantially as described.

13. In a selective signaling system, two separate lines connecting a central station with a plurality of signaling-stations, and a third line carrying high-potential current and including the signaling-stations, a source of current at the central station, and means for applying the current therefrom over the two separate lines to operate the signals at the signaling-stations, and means at the signaling-stations made operative on the movement of the signal to apply current from the third line over one of the two separate lines to operate a test-signal at the central station.

14. In a selective signaling system for electric railways, a central station and a plurality of signaling-stations, circuit connections between the same, a test signal or lamp at the central station for each of the signaling-stations, a semaphore, means at each signaling-station for putting the semaphore into operative condition, coöperative means at the central station for selecting a signaling-station to operate its signal, a return-current device actuated through the operated signal to display the indicator at the central station corresponding to the signaling-station whose signal has been set.

15. In a signaling system, a selector, a selecting device and a signal-setting mechanism, two lines connecting the selector with the selecting device and the signal-setting mechanism, in combination with a branch containing a lamp from a line of relatively high potential, connected permanently through the signal-setting mechanism and adapted to be connected through the selecting device at the selector.

16. In a selector for a signaling system, a single unidirectional rotating arm mounted on a shaft carrying a current-interrupter and a retarding mechanism combined with means for the selective positioning of the arm, means carried by the arm for applying current to a line, and means controlled by the arm for applying current from the line to a local circuit.

17. A selector comprising a unidirectional arm rotating over a dial arranged for selecting a substation, said arm carrying a lever adapted to be depressed to set a signal at the substation and to be raised to release said set signal, a source of current adapted to be connected with said arm in combination with a lug carried by the arm adapted to control the application of current from said source to a local circuit for displaying a local signal on the face of the selector, said current being under the control of the signal at the substation.

18. In a selector for a selective signaling system, a single unidirectional rotating arm, a circuit-interrupting device operated by said arm and adapted to send impulses of current over the line, a switch on the arm arranged for applying at selected points over two lines constant current, and a signaling device in a local circuit controlled by said arm.

19. In a selector of a signaling system, a single unidirectional rotating arm mounted on a shaft carrying a current-interrupter and a retarding mechanism, said arm carrying a lever controlling two switches, one switch actuated by a depression of the lever to apply current over a line to set a signal, and the second switch actuated by a lifting of the lever to apply current over two lines to release said set signal, means for connecting a source of current with said arm, a lug on said arm adapted to control the connection of said current from the arm to a local circuit for displaying a lamp-signal on the face of the selector.

20. In a selective device for a selective signaling system, a step-by-step switching-wheel actuated through an electromagnet, two sets of switch-springs controlled by said wheel and adapted to be closed in sequence through a forward movement, a pawl normally restraining the backward movement of said wheel and an electromagnet actuating said pawl to release said wheel, and means for causing the backward movement of the wheel when released, combined substantially as described.

21. In a selective device for a selective signaling system, two electromagnets controlling the movement of a step-by-step switching-wheel, two sets of switch-springs controlled by said wheel and adapted to be closed in sequence, in combination with means for giving the wheel a backward movement, whereby one electromagnet operated alone produces a forward movement of the wheel to close the switch-springs and both magnets operated together produce a backward movement of said wheel.

22. The combination in a selective signaling system for electric railways, of a signal-setting mechanism comprising an electromagnet connected to a signal with a switch operated through the movement of said signal and adapted to transfer a test-circuit connection, a locking device for said signal controlled by an electromagnet and a lamp for said signal under the control of the switch.

23. The combination in a signal-setting mechanism of a solenoid-electromagnet, with a plunger therefor connected to a rotating shaft carrying a semaphore-arm, a locking device for said shaft normally inoperative but put into operative position through an electromagnet $E^4$, a switch controlled by said shaft, said switch adapted to complete circuits through the semaphore-arm and circuit connections from the signal-setting mechanism to a coöperating selecting device.

24. The combination with a signaling system for selectively setting from a central station a signal at one of a plurality of substations, of a selector at the central station, a selecting device and a signal-setting mechanism at each of the substations, said selector consisting of a unidirectional rotating arm for sending impulses of current over a line to operate the selecting devices to select a substation, a lever on the arm for applying current from a battery over a line to operate the signal-setting mechanism, a switch operated by the signal-setting mechanism to apply through the coöperation of the selecting device current from an external source to the selector-arm for use in a local circuit of the selector when the arm reaches a position synchronously with, and corresponding to that of the selecting device, a signal in the local circuit and a locking-relay controlling the display of said signal, a switch operated by the lever and mounted on the rotating arm for applying current over the two lines to release the signal, and means for restoring the selecting devices to their normal positions.

25. The combination with the arm $A^{14}$ supporting the semaphore, of the hood $A^{15}$ extending over the pivotal support of said arm, the said hood having inclined troughs on the face thereof extending beyond the range of movement of said arm, substantially as and for the purpose specified.

26. A signal-station for use with railway signaling systems having signal-operating mechanism mounted within an inclosing case, a second inclosing case containing a selective device mounted within said first-mentioned inclosing case but independent of the signal-operating mechanism, whereby the second inclosing case with its selective device may be removed as a unit from said first-mentioned case without disturbing the signal-operating mechanism.

In witness whereof I hereunto subscribe my name this 7th day of July, A. D. 1905.

FRANK R. McBERTY.

Witnesses:
  F. P. McINTOSH,
  E. F. BEAUBIEN.